(12) United States Patent
Kinsley et al.

(10) Patent No.: US 7,325,891 B1
(45) Date of Patent: Feb. 5, 2008

(54) COMPUTER CART

(75) Inventors: Mark Anthony Kinsley, Elmhurst, IL (US); Philip John Sopicki, Glenview, IL (US)

(73) Assignee: Bretford Manufacturing, Inc., Franklin Park, IL (US)

( * ) Notice: Subject to any disclaimer, the term of this patent is extended or adjusted under 35 U.S.C. 154(b) by 0 days.

(21) Appl. No.: 11/592,097

(22) Filed: Nov. 2, 2006

Related U.S. Application Data (63) Continuation-in-part of application No. 29/257,361, filed on Apr. 3, 2006, now Pat. No. Des. 547,920.

(51) Int. Cl.
*F25D 11/00* (2006.01)

(52) U.S. Cl. ............... 312/257; 312/223; 312/107; 312/312; 280/47.35; 280/79.2

(58) Field of Classification Search ............ 280/47.35, 280/79.2; 312/257, 223, 107, 229
See application file for complete search history.

(56) References Cited

U.S. PATENT DOCUMENTS

| | | | | |
|---|---|---|---|---|
| 3,945,696 A | * | 3/1976 | Yellin ............... | 312/265.2 |
| 4,022,517 A | * | 5/1977 | Eckert ............... | 312/317.1 |
| 6,008,621 A | * | 12/1999 | Madison et al. ....... | 320/107 |
| 6,218,796 B1 | * | 4/2001 | Kozlowski ........... | 318/280 |
| 2001/0035702 A1 | * | 11/2001 | Murphy et al. ........ | 312/229 |
| 2003/0141687 A1 | * | 7/2003 | Wixted et al. ........ | 280/47.35 |

* cited by examiner

*Primary Examiner*—Christohper P. Ellis
*Assistant Examiner*—Cynthia F. Collado
(74) *Attorney, Agent, or Firm*—John C. Gorecki (57) ABSTRACT

A computer cart is formed to have ventilation channels extending along its sides to enable computers to be ventilated while stored in the computer cart without requiring excessive machining of the side panels forming the cart. The cart includes a frame with an external skin formed of panels. The upper edges of the side panels are offset from an edge of a top panel so that a ventilation channel is formed between the top panel and the side panels. Optionally, the channel may also extend between the top panel and a side panel and between the top panel and a front panel including doors that allow access to an inside of the computer cart. A similar channel may be formed on the bottom. As air is heated by computers within the computer cart, the warm air will rise and exit the computer cart via the upper ventilation channel, while drawing in cooler air through the lower ventilation channel.

18 Claims, 10 Drawing Sheets

COMPUTER CART

CROSS-REFERENCE TO RELATED APPLICATIONS

This application is a continuation in part of and claims priority to design patent application No. 29/257,361, filed Apr. 3, 2006 and entitled COMPUTER CART, the content of which is hereby incorporated herein by reference.

BACKGROUND OF THE INVENTION

1. Field of the Invention

The present invention relates to computer storage systems and, more particularly, to a computer cart.

2. Description of the Related Art

Computers, such as laptop computers and tablet computers, are commonly used in educational facilities. When not in use, the computers are generally required to be stored in a secure manner to prevent them from being stolen or tampered with. Accordingly, it is common to store the computers in a lockable cart that will deter the students and other people from accessing the computers without permission. Often the cart is provided with wheels so that it may be moved to different places so that the computers may be used in different classrooms.

Where the computers include a battery, the computer cart may include electrical strips that will enable the computers to be charged while being stored in the computer cart. Since charging the computers generates heat, it is generally necessary to ventilate the computers within the cart to prevent them from overheating.

One common way to ventilate the interior of a computer cart is to create ventilation holes in the panels that make up the sides and front or back of the cart. While this enables ventilation to occur, it requires significant machining since each of the ventilation holes must be stamped or cut out of the material. Additionally, material with holes machined therein is generally less strong than the material without holes. Accordingly, it would be advantageous to provide a new computer cart having a different type of ventilation structure.

SUMMARY OF THE INVENTION

A computer cart is formed to have ventilation channels extending along its sides to enable computers to be ventilated while stored in the computer cart without requiring excessive machining of the panels forming the cart. The cart includes a frame with an external skin formed of panels. The upper edges of the side panels are offset from an edge of a top panel so that a ventilation channel is formed between the top panel and the side panels. Optionally, the channel may also extend between the top panel and a rear panel, and between the top panel and a front panel including doors that allow access to an inside of the computer cart. A similar channel may be formed on the bottom. As air is heated by computers within the computer cart, the warm air rises and exits the computer cart via the upper ventilation channel, while drawing in cooler air through the lower ventilation channel.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, and dimensions have not been described in detail so as not to obscure the invention.

Figure 1:
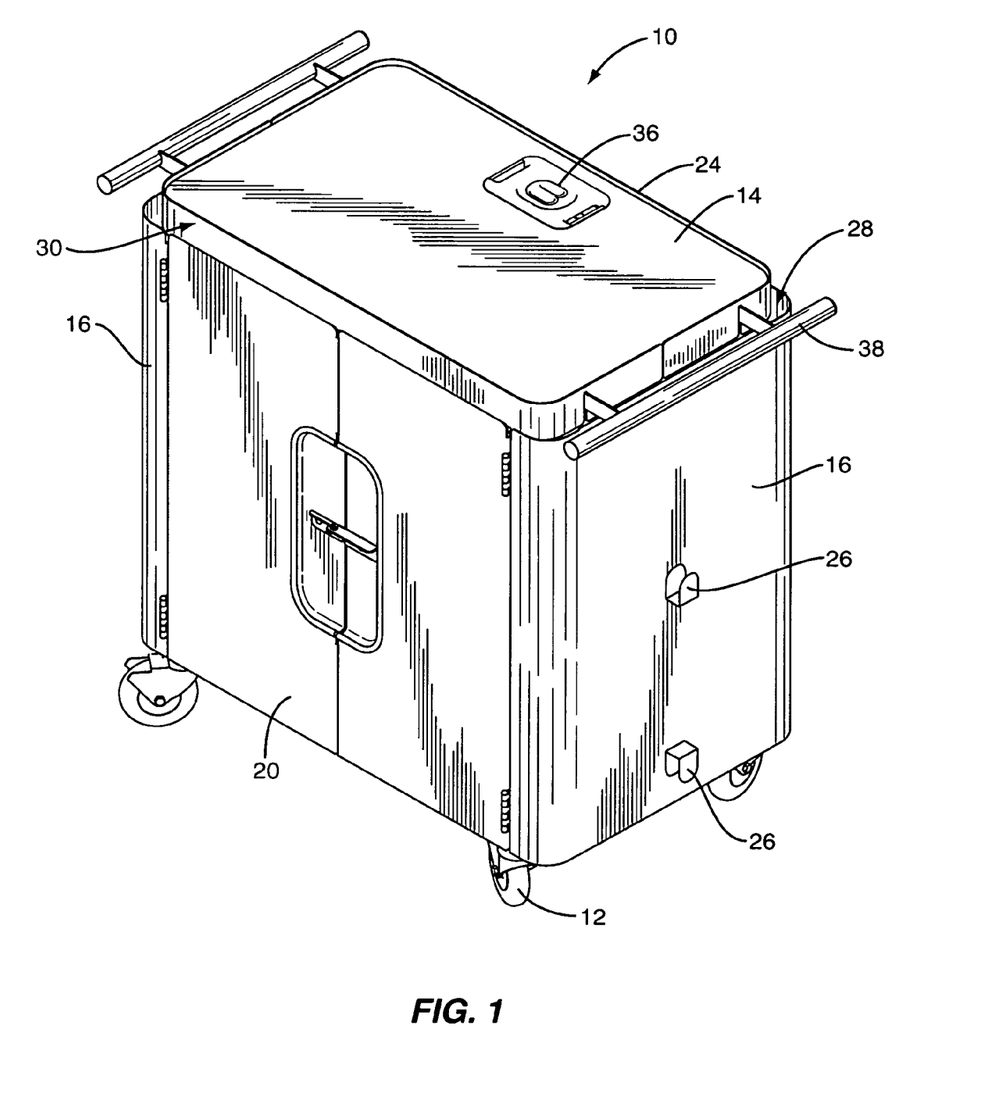
FIG. 1 is a perspective view of a computer cart according to an embodiment of the invention.

FIG. 1 illustrates an embodiment of a computer cart 10 according to an embodiment of the invention. As shown in FIG. 1, the computer cart generally is formed as a cabinet having wheels 12 that are configured to enable the cart to be mobile. The wheels may be castors or other types of conventional wheels and the invention is not limited to the particular wheels shown in FIG. 1.

Figure 2:
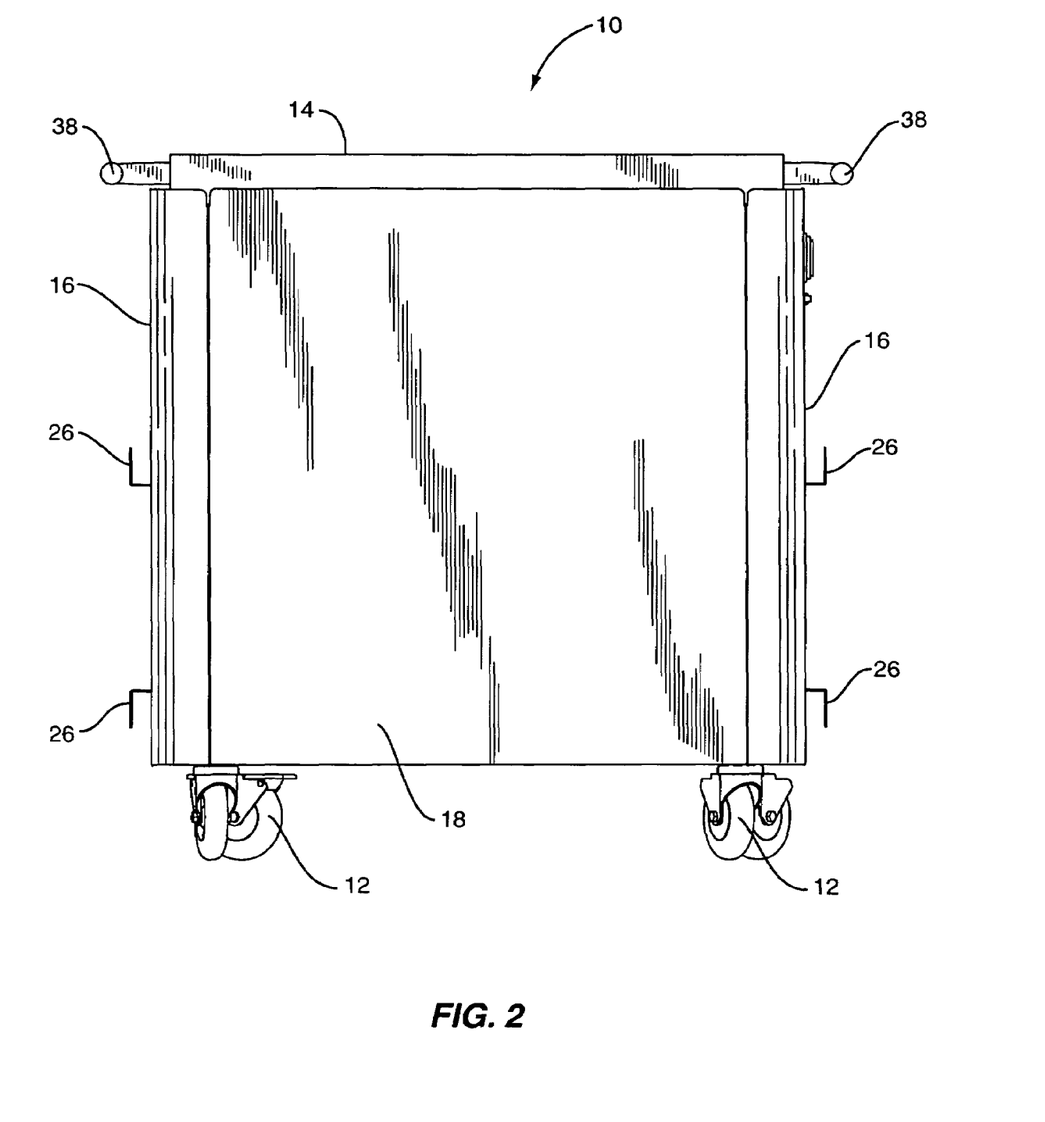
FIG. 2 is a back view of the computer cart of FIG. 1.
Figure 4:
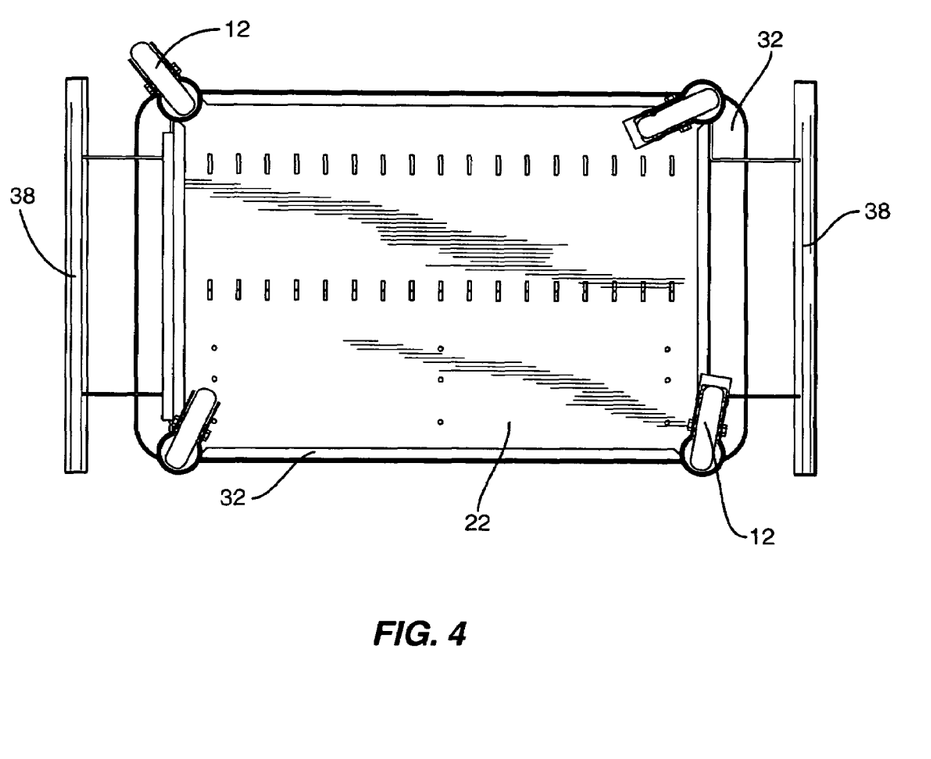
FIG. 4 is a bottom view of the computer cart of FIG. 1.

The interior of the cart is enclosed by a skin including a top panel 14, side panels 16, a back panel 18 (see FIG. 2), and a pair of doors 20 that form the front of the cart. The bottom of the cart is closed as well via bottom panel 22 (see FIG. 4). Panels 14-22 form a secure enclosure that will enable computers stored within the computer cart to be protected, so that theft or tampering with the computers may be deterred.

The doors may be supported on hinges connected to the frame or connected to another portion of the front panel to enable them to open relative to the interior of the cabinet. Numerous different door structures may be used and the invention is not limited to the use of particular doors on the computer cart.

The top panel may be made of blow molded plastic, wood, or another material that will enable the top to function as a work surface. Optionally a lip 24 may be formed around the edges of the top surface so that any liquid that is spilled on the top panel will not drip down into the cart. Optionally, as shown in FIG. 1, a computer pole mount 36 may be formed on the top panel to enable a pole to be connected to the computer cart. Poles are commonly used to mount monitors and other computer equipment. The invention is not limited to fan embodiment that includes a pole mount feature or to the use of a particular type of pole mount.

The side panels 16, back panel 18, doors 20, and bottom panel 22 may be formed, for example, of $1/16^{th}$ inch rolled steel plate. Other types of material may be used as well, and the invention is not limited to the use of this particular type of material. The panels may be formed separately and bolted or welded together, or alternatively two or more of the panels, such as the side and back panels, may be formed from one piece of material.

In the embodiment shown in FIG. 1, the side panels are formed to be continuous and substantially devoid of ventilation holes. Although several holes may be provided in the sides for mounting hardware, such as to mount cord hooks 26, these holes are functional rather than for ventilation of the interior of the computer cart and thus provide merely incidental ventilation.

Figure 3:
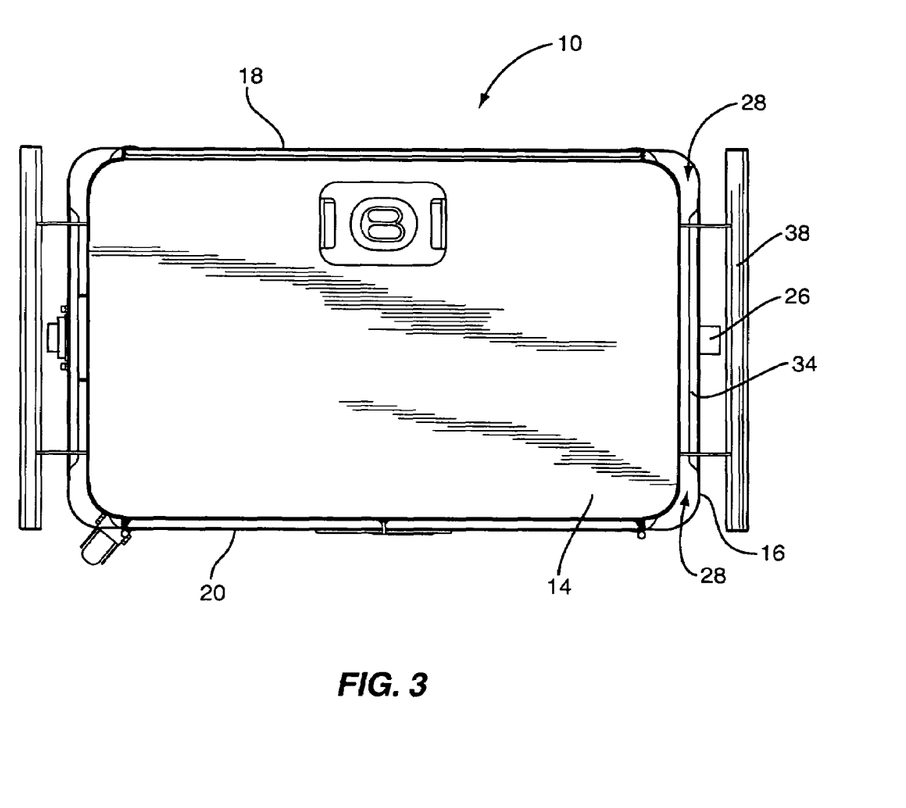
FIG. 3 is a top view of the computer cart of FIG. 1.

Ventilation of the interior of the computer cart is provided by a ventilation channel 28 that extends at least on the sides of the computer cart, and optionally around the perimeter of the computer cart. Specifically, as shown in FIG. 1, a ventilation channel 28 may be formed by causing the side panels 26, back panel 18, and doors 20 to be held off from the outer edge 30 of the top panel 14. This may be seen clearly in FIG. 3, which shows a top view of the cart. Notice that the side panels in particular are placed a distance away from the edge of the top panel, causing a ventilation channel 28 to be formed on each end of the cart that will allow heat generated by computers stored in the cart to escape. A smaller channel may likewise be formed along the back edge of the cart between back panel 22 and the top panel 14. Similarly, the ventilation channel optionally also may be formed along the front of the cart between doors 20 and the top edge of the top panel.

The ventilation channel is formed along the edge of the top panel to enable warm that has been heated by computers stored in the cart to escape. Similarly, a lower ventilation channel 32 may be formed on the bottom of the cart to enable cool air to be pulled into the cart to form a chimney effect in which cooler air is drawn into the cart by as warmer air rises and exits the cart through the top ventilation channel 28. Additionally, other apertures may be formed in the lower panel 22 that will enable air to pass through the lower panel in places so that additional avenues for cool air may be provided to increase the dispersion of cool air through the cart. Thus, although the embodiment shown in FIG. 1 has side panels that are substantially devoid of ventilation holes, the bottom panel is not similarly limited in this manner as optionally ventilation holes may be formed in the bottom panel of the computer cart.

The side and back panels may be attached to an interior frame of the computer cart by using extending plates that depend from an interior surface of the panels. The extending plates enable the side panels to be offset from the frame to enable the channels to be formed along the edge of the top panel. The invention is not limited to the particular way in which the panels are attached to the frame.

Since the ventilation channel exposes part of the interior of the cart, and may make it possible for a person to obtain access to the inside of the cart, according to an embodiment of the invention, ridges 34 are placed at the top edge and optionally along the bottom edge to extend inward toward the outer edge 32 of the top panel. The ridges 34 reduce the size of the ventilation channel to make it more difficult for someone to reach into the computer cart through the ventilation channel. Additionally, the ridges 34 strengthen the side panels to reduce the ability for a person to bend the side panel away from the top edge. This helps to prevent a person from attempting to obtain access to any computers stored in the computer cart by bending the side panel to increase the size of the ventilation channel.

The computer cart may include other features such as handles that will enable the cart to be pushed from one or more sides 38. The invention is not limited to the particular shape of the handle.

Figure 5:
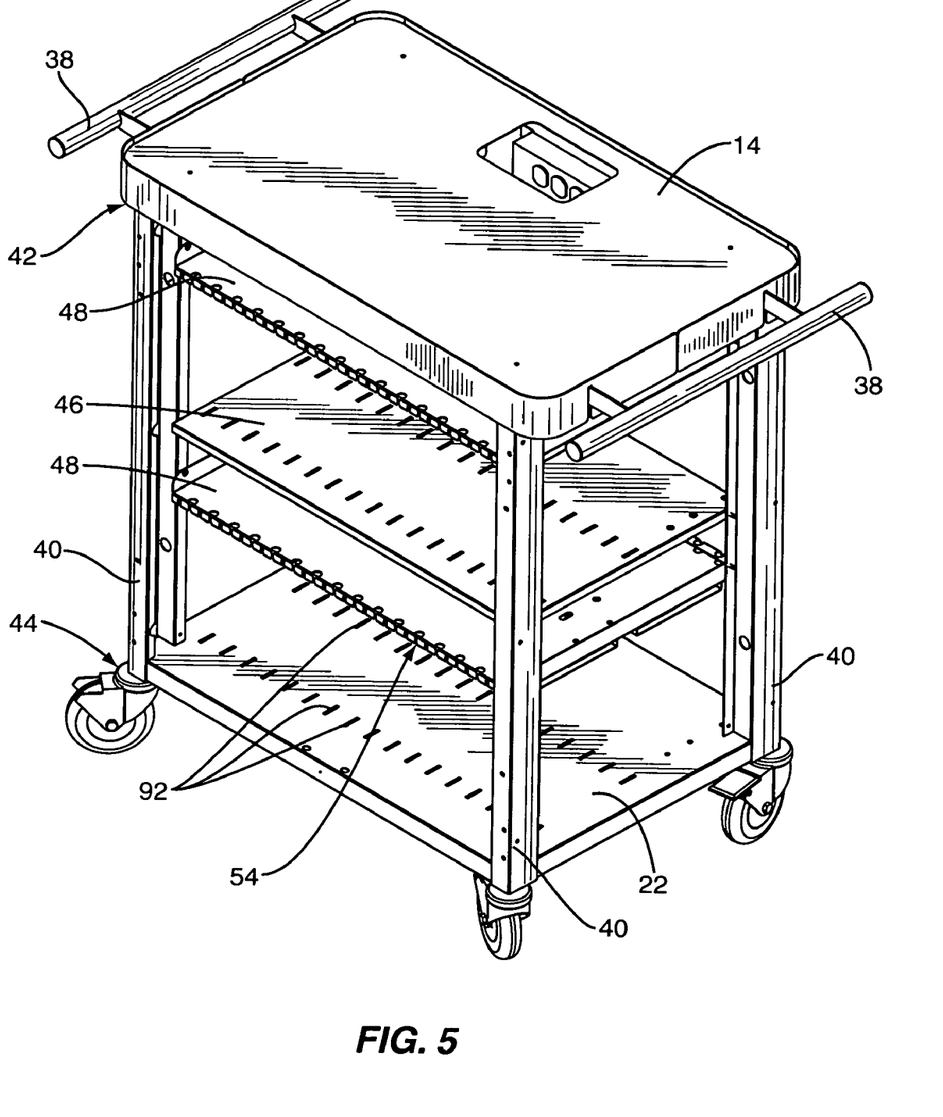
FIG. 5 is a perspective view of the computer cart of FIG. 1 with the outside skin removed to show the interior details according to an embodiment of the invention.
Figure 6:
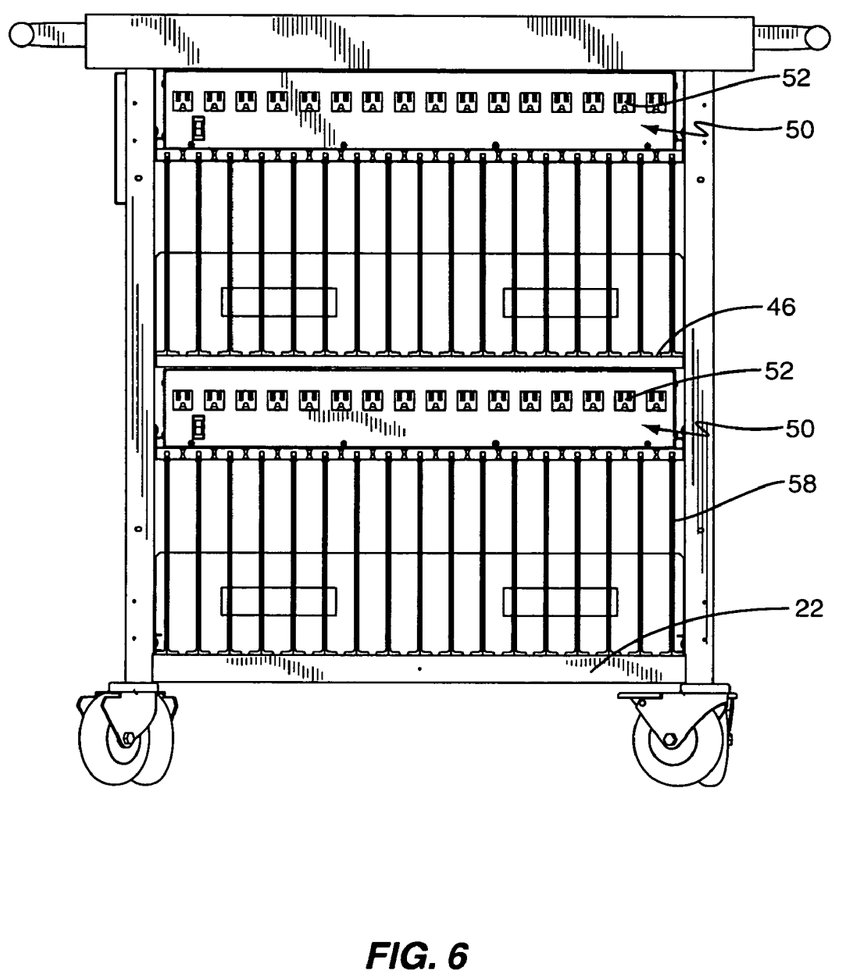
FIG. 6 is a front view of the computer cart of FIG. 5.

FIG. 5 shows the inside of the cart if the side and back panels and front doors were removed. As shown in FIG. 5, the computer cart has a frame generally including four upright members (legs) 40 that are connected on their top end 42 to the top panel 14 and on their lower end 44 to the bottom panel. The legs also support one or more shelves along their length to enable multiple shelves of computers to be stored in the computer cart. Specifically, in the embodiment shown in FIG. 5, the computers are designed to be stored on the bottom panel 22 and on a computer support shelf 46. These two surfaces form two layers on which computers may be stored when the computers are not being used.

The legs also support two power supply shelves 48 (one for each surface on which the computers will be stored). Since the computers will be plugged in while in the computer cart, each power supply shelf includes a multiple receptacle power strip. The power strip includes conventional three prong plugs and may be surge protected to prevent power surges from being passed on to computers stored in the computer cart. The power strips 50 may be located relatively close to the front of the power supply shelves 48 to make it easier for users to access the receptacles 52 when putting the computers into the cart or removing computers from the cart.

Generally laptop computers use an AC adapter to convert 120 volt AC power into a lower voltage DC power that may be used to run the computer and to charge the computer battery. Optionally, the power supply shelves 48 may be used to hold the AC converters and to perform cord management for the computers while stored in the computer cart Additionally, the front edge of the power supply shelf may have cord slots 54 formed therein to help clasp the cord end while the laptop is being inserted into the computer cart. In certain instances, it may be desirable to put the computers and AC adapters into the slots of the cart rather than having the AC adapters stored on the power supply shelf. By causing slots to be formed in the front edge of the power supply shelf, the male end of the plug may be hooked on the power supply shelf while the computer and AC adapter are being stored in the slot so that the computers may be plugged into the power strip once the computers have all been stored. The cord slots thus may be used to support the end of the power cord so that the male ends of the power cords are easily accessible once it is time to plug the computers in for charging.

To enable the computers to be stored vertically, dividers 58 are provided that fit into the bottom panel and into the computer support shelf. The top edge of the divider may optionally engage the lower surface of the power supply shelves 48 to form a continuous enclosure around a computer stored in the computer cart. The dividers provide slots, each of which is configured to hold an individual computer. On the ends, the dividers prevent a student or other person from removing one of the computers through the ventilation channels.

The dividers may be formed to include one or more ventilation holes to enable air to circulate through the dividers. Also, the dividers, as shown for example in FIG. 7, do not extend the full depth of the cart, so that air is allowed to circulate through the cart particularly around the back edge of the computers. Since many computers have their fan and other heat dissipative components toward the back, this facilitates cooling of the computers when stored in the computer cart.

Figure 7:
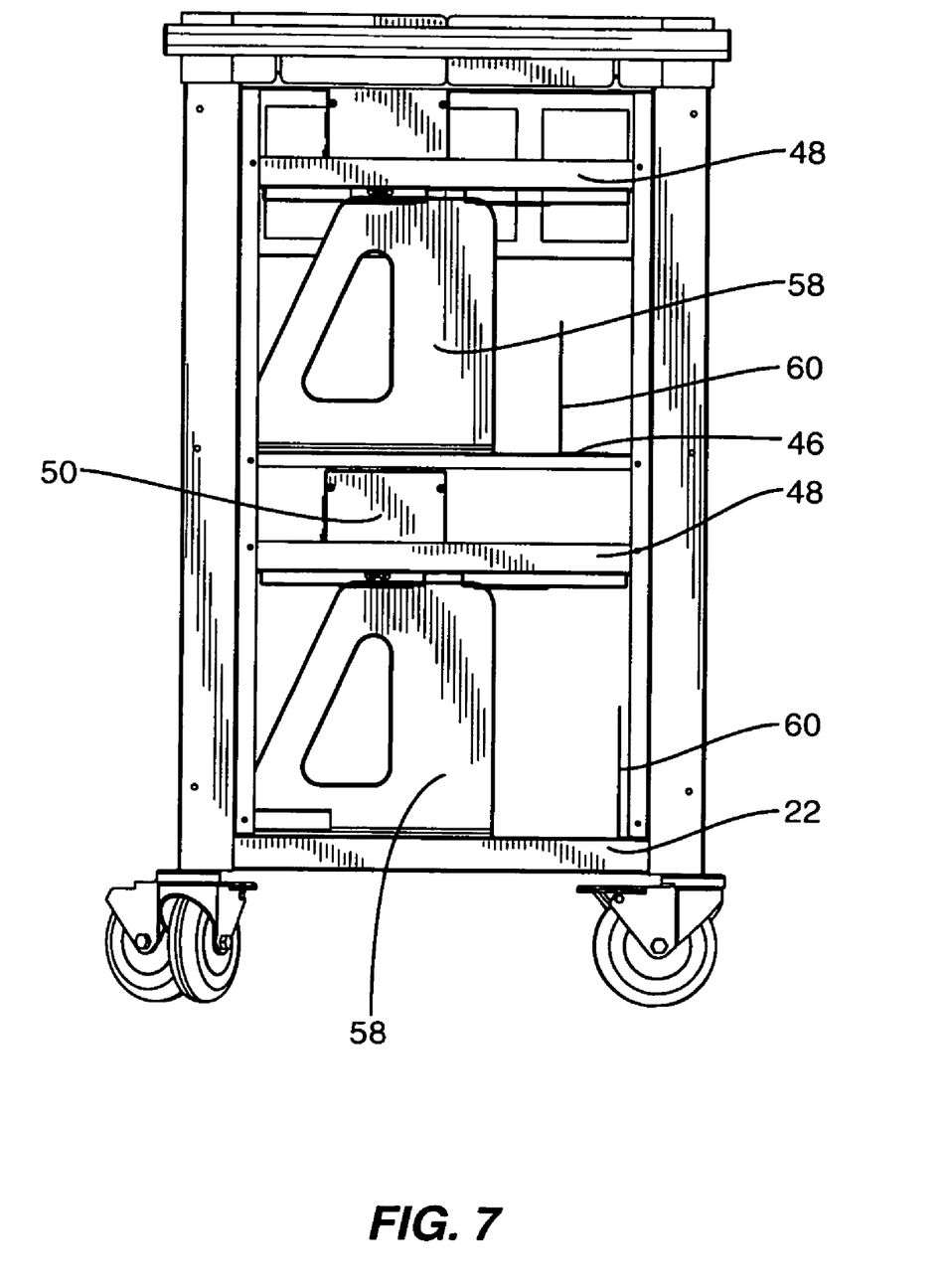
FIG. 7 is a side view of the computer cart of FIG. 5.

A backstop 60 is provided to enable the depth of the slots formed by the dividers 58 to be adjusted. Specifically, as shown in FIG. 7, the backstop 60 may be attached to the bottom panel 22 or to the computer support shelf 46 in one of several different positions so that the depth of the slots may be adjusted to fit the particular type of computer to be stored in the computer cart. The different positions may be defined, for example, by forming apertures 62 in the bottom panel or computer support shelf 46 and selectively attaching the backstop 60 using bolts or other attachment mechanisms.

Figure 8:
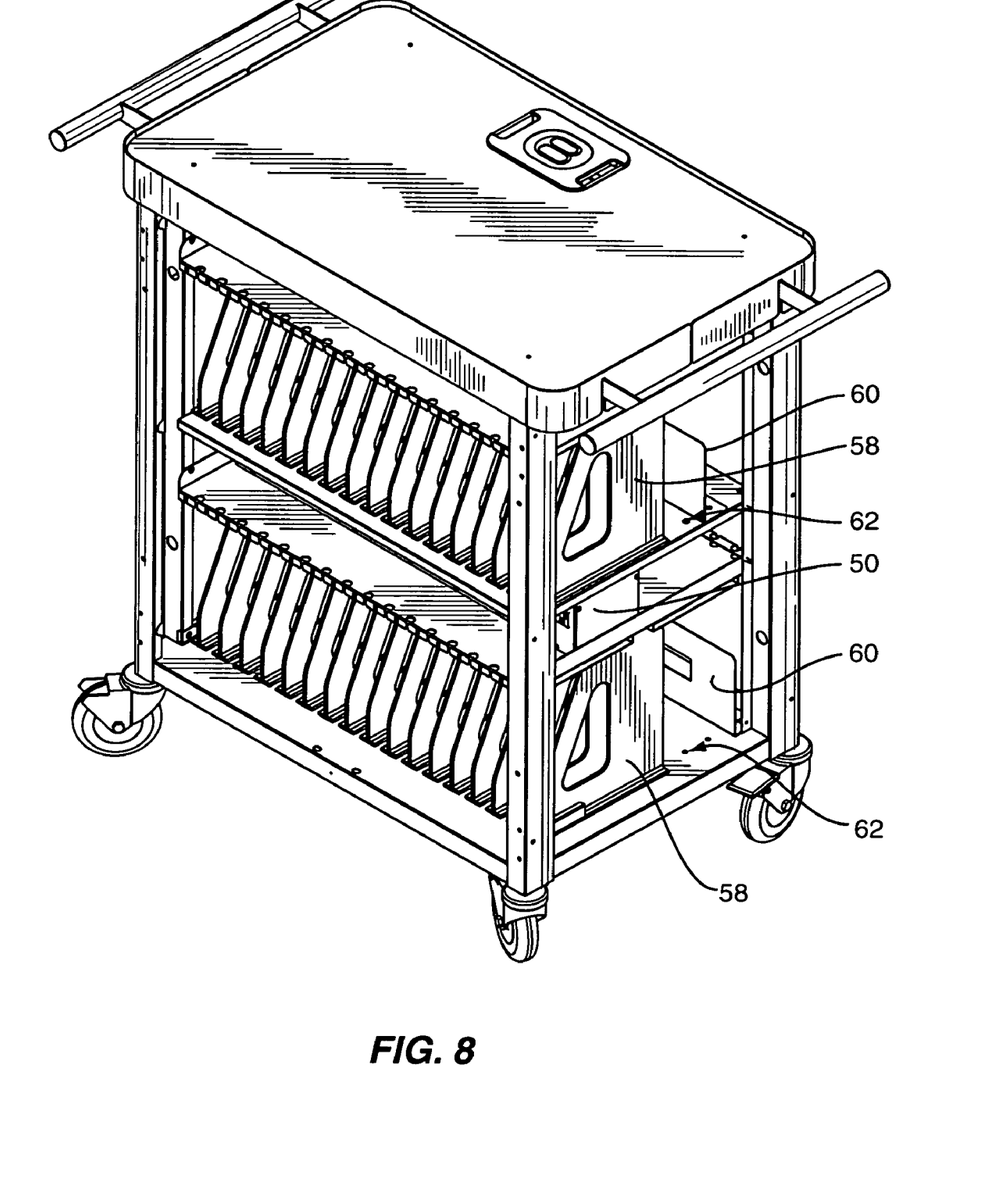
FIG. 8 is another front perspective view of the computer cart of FIG. 5 including divider panels.
Figure 9:
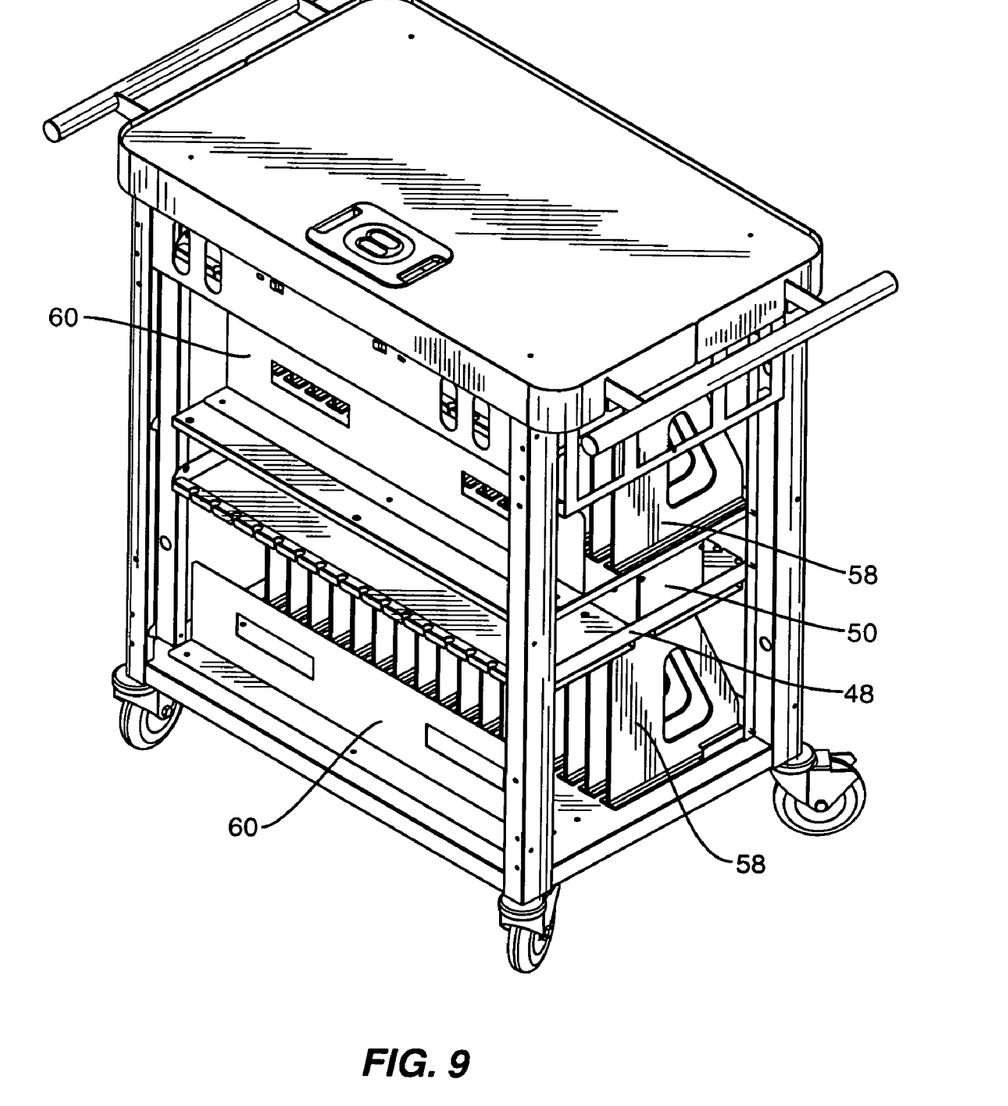
FIG. 9 is a back perspective view of the computer cart of FIG. 5 including divider panels.

FIG. 8 shows a complete assembled computer cart without the side and back panels and without the front doors, so that the slots defined by the dividers 58 may be seen. As shown in FIG. 8, the dividers enable multiple slots to be created so that many different computers may be stored in the computer cart. FIG. 9 likewise shows the same computer cart but from the back.

Figure 10:
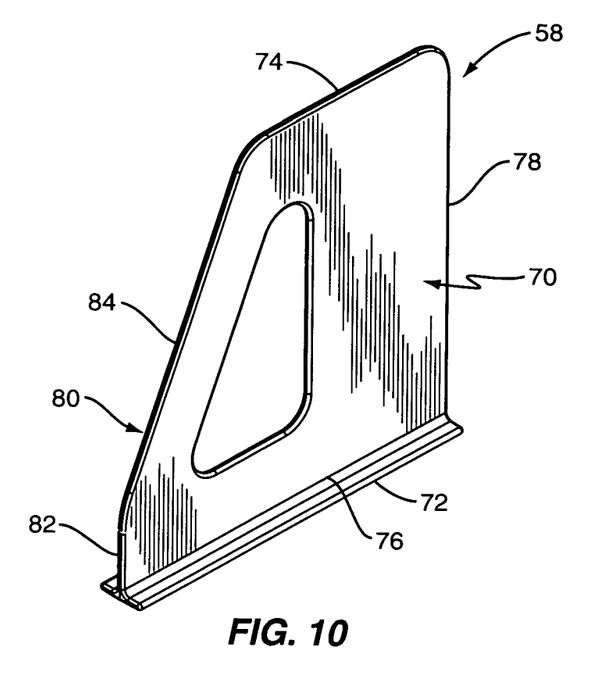
FIGS. 10-12 are three views of example divider panels that may be used in the cart of FIG. 1 and which are shown installed in the computer cart in FIGS. 8 and 9.
Figure 11:
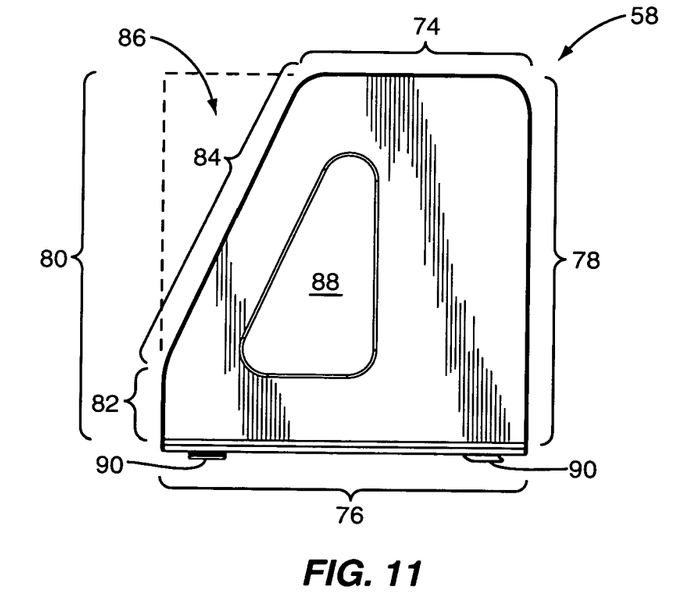
Figure 12:
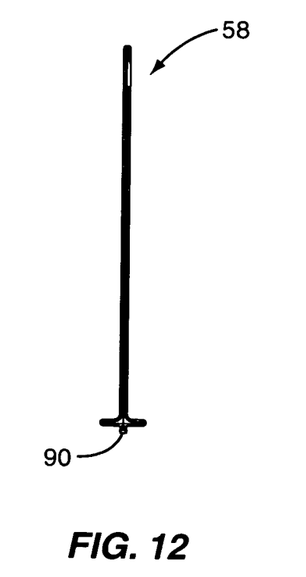

FIGS. 10-12 show one embodiment of a divider that may be used in the computer cart to define computer slots as described in greater detail above. As shown in FIGS. 10-12, the divider 58 may include a fin 70 and a base 72. The fin is generally formed as a flat plate of material having a top edge 74, a bottom edge 76, a back edge 78, and a front edge 80. In operation the divider will be installed in the computer cart so that the front edge is facing the doors of the cart (see FIGS. 7 and 8).

The front edge 80 of the fin, as shown in FIGS. 10-12, includes a lower part 82 that is formed to extend vertically for a short distance and an upper part 84 that angles back toward the back edge. The upper part defines a triangular cutout area 86 that will allow a person to more easily grasp a computer stored in one of the slots. Specifically, by removing some of the material on the upper front edge of the divider, an upper area of a computer stored in the slot defined by the dividers will not be obstructed by the dividers. This feature of the dividers makes it easier to grab a computer stored in the slot.

The dividers also include a central aperture 88 that will allow air to move between the slots to encourage air circulation within the computer cart. Although the embodiment shown in FIGS. 10-12 includes only one aperture the invention is not limited in this manner as other numbers of apertures may be used as well.

The base 72 is connected to the fin 70 or formed to be integral with the fin and extend on either side of the fin 70. The lateral extension of the base 72 engages the top surface of the bottom panel 22 or computer support shelf 46 to hold the fin vertical relative to the bottom panel or computer support shelf. Optionally, the top edge 74 of the fin may also engage a groove or other structure on a bottom surface of a respective power supply shelf to further prevent lateral movement of the top edge of the fin.

The base 72 may extend outward from the fin a distance of up to half of the width of a slot in the computer cart so that the bases of adjacent dividers do not overlap. In operation, a pair of dividers will define one slot, and a computer once inserted into the slot will sit on top of the bases from the adjacent dividers. Optionally, to provide cushion for the computers, the top of the base may be provided with a material that will provide additional cushioning for the computers to reduce the transmission of shock to the computer that may be formed by movement of the cart.

The base 72 also includes tabs 90 configured to engage slots 92 in bottom panel 22 and computer support shelf 46. The tabs 90 may be configured to simply extend through the slots 92 or may be configured to clip onto the shelf/bottom panel once inserted to prevent or resist later removal of the dividers. The invention is not limited to the particular manner in which the dividers are connected to the bottom panel 22 and the computer support shelf 46.

Although the embodiment describe herein and shown in the figures does not include a fan to circulate air, the invention is not limited to an embodiment that only uses passive conductive cooling, but rather the same design may be used in connection with an embodiment that has an active cooling mechanism. For example, one or more fans may be provided to circulate air within the computer cart so that a greater volume of air may come in contact with the computers stored within the cart. Heat that is drawn off of the computers into the circulating air will rise through the ventilation channels as discussed in greater detail above.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A computer cart, comprising:
an inner frame containing shelves configured to hold a plurality of computers; and
an outer skin, the outer skin including a top panel, a pair of side panels, a back panel, and a front panel, the front panel including doors configured to provide access to an inside of the computer cart,
wherein the top panel and at least one of the side panels are offset to define a ventilation channel there between to enable warm air to escape from the inside of the computer cart.

2. The computer cart of claim 1, wherein an upper edge of the at least one side panel is offset from an outer perimeter of the top panel to define the ventilation channel between the side panel and the top panel.

3. The computer cart of claim 2, wherein the top edge of the side panel further comprises a ridge configured to extend inward toward the outer perimeter of the top panel to reduce the size of the ventilation channel and to strengthen the side panel.

4. The computer cart of claim 1, further comprising a bottom panel, the bottom panel being sized to define a bottom ventilation channel between an outer perimeter of the bottom panel and at least one of the side panels.

5. The computer cart of claim 4, wherein the bottom panel is configured to support a plurality of computers.

6. The computer cart of claim 4, further comprising a plurality of dividers attached to the bottom panel and configured to define slots to receive the computers.

7. The computer cart of claim 6, wherein each divider includes a fin and a base portion, the fin including a top edge, a bottom edge, a back edge, and a front edge, the front edge including a lower part that is formed to extend vertically for a short distance and an upper part that angles back toward the back edge.

8. The computer cart of claim 7, wherein each fin has a central aperture defined therein and configured to enable air to circulate between the slots.

9. The computer cart of claim 7, wherein the base portion extends on both sides of the fin for up to half of the width of the slot.

10. The computer cart of claim 6, wherein the bottom panel includes a plurality of apertures configured to receive tabs on the dividers to hold the dividers within the computer cart.

11. The computer cart of claim 10, further comprising at least two power supply shelves, and wherein the power supply shelves define grooves configured to receive upper edges of the dividers.

12. The computer cart of claim 6, further comprising an adjustable back stop configured to enable a depth of the slots to be adjusted to accommodate different sized computers.

13. The computer cart of claim 4, wherein the inner frame is configured to support the outer skin, the inner frame having a plurality of vertical leg members and at least one computer support shelf suspended on the vertical leg members part way between the bottom panel and the top panel.

14. The computer cart of claim 13, wherein the bottom panel defines a second computer support shelf.

15. The computer cart of claim 13, further comprising at least two power supply shelves.

16. The computer cart of claim 15, further comprising a power strip containing power receptacles on each of the power supply shelves.

17. The computer cart of claim 1, wherein the side panels are substantially devoid of ventilation holes.

18. A computer cart, comprising:
   an inner frame configured to hold a plurality of computers;
   a top panel defining a top surface of the computer cart;
   a bottom panel defining a bottom surface of the computer cart;
   a back panel defining a rear wall of the computer cart;
   a pair of side panels defining side walls of the computer cart; and
   a front panel defining a front of the computer cart and configured to provide access to the computer cart;
   wherein a ventilation channel is defined between the top panel and at least one of the side panels by causing a top edge of the side panel to be offset from an outer edge of the top panel to define the ventilation channel there between.

* * * * *